United States Patent
Babik

[11] 3,905,467
[45] Sept. 16, 1975

[54] ARTICLE ALIGNING APPARATUS
[75] Inventor: Peter P. Babik, Canton, Ohio
[73] Assignee: Alto Company, York, Pa.
[22] Filed: Feb. 21, 1974
[21] Appl. No.: 444,360

Related U.S. Application Data
[63] Continuation of Ser. Nos. 226,990, Feb. 16, 1972, abandoned, and Ser. No. 857,304, Sept. 12, 1969, abandoned.

[52] U.S. Cl. .................................. 198/30; 198/264
[51] Int. Cl.² .......................................... B65G 47/26
[58] Field of Search............ 198/31 R, 30, 172, 173, 198/174, 29, 264, 265, 282, 283; 221/298; 193/38, 39, 40

[56] References Cited
UNITED STATES PATENTS

| | | | |
|---|---|---|---|
| 885,881 | 4/1908 | Steckel | 198/283 |
| 3,119,482 | 1/1964 | Ganz | 198/264 |

*Primary Examiner*—Evon C. Blunk
*Assistant Examiner*—Douglas D. Watts
*Attorney, Agent, or Firm*—Thomas Hooker

[57] ABSTRACT

An apparatus for aligning articles such as baked goods or the like in rows prior to packaging. The articles slide down an inclined chute where they are contacted by rows of deflectors moving in the opposite direction to the articles. The deflectors bump against the articles and urge them into parallel rows in the chute. The deflectors are pins carried on a conveyor positioned beneath the chute with the pins extending through longitudinal slots through the chute. A gate at the bottom of the chute causes a plurality of articles to collect in rows on a movable platform. Periodically the platform raises to block further articles from sliding thereon and the gate lowers to permit the articles to slide off the platform.

5 Claims, 8 Drawing Figures

INVENTOR.
PETER P BABIK

INVENTOR.
PETER P. BABIK
BY
ATTORNEY

INVENTOR.
PETER P. BABIK
BY *P. Milliken*
ATTORNEY

ARTICLE ALIGNING APPARATUS

This is a continuation of copending Application Ser. No. 226,990, now abandoned filed Feb. 16, 1972 and of Application Ser. No. 857,304, now abandoned filed Sept. 12, 1969.

OBJECTS OF THE INVENTION

It is the primary object of this invention to provide an apparatus for aligning buns or other baked goods and the like into rows for packaging without pinching or mashing the articles to be packaged.

A further object of the invention is to provide an apparatus which will permit free movement of the articles at all times without the articles becoming bunched or clogged in the apparatus.

These and other objects of the invention will become more fully apparent as the description proceeds in the following specification and accompanying drawings.

PREFERRED EMBODIMENTS OF THE INVENTION

Figure 1:
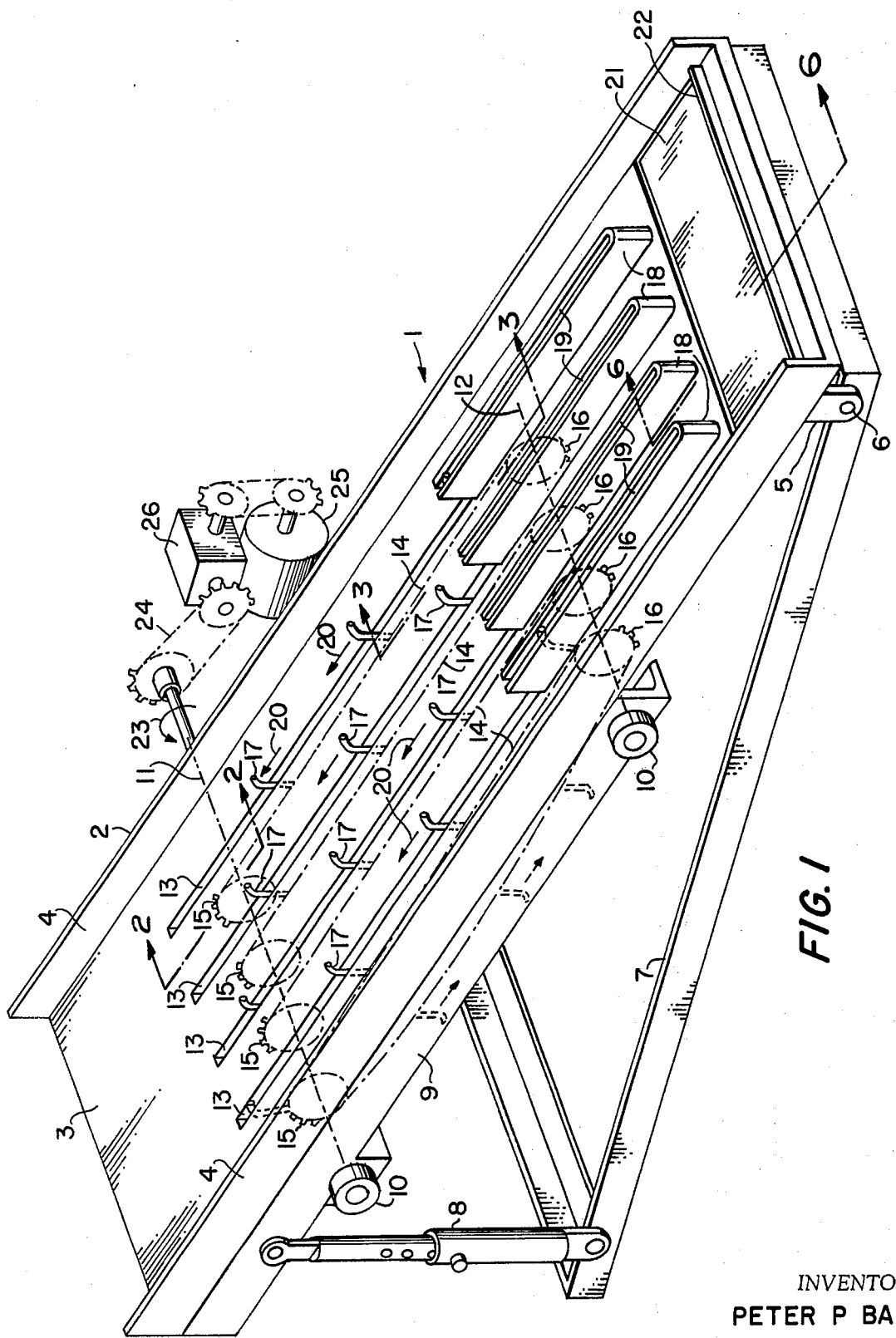
FIG. 1 is a perspective view of the overall apparatus of the invention.

Referring now to FIG. 1, the article aligning apparatus is indicated as a whole by the numeral 1. The apparatus 1 has an inclined chute 2 having a bottom 3 and a pair of sides 4. The lower end of the chute 2 is pivotally connected by arm members 5 on each side thereof, each joined by a pivot pin 6 to a rectangular base frame 7. The upper end of the chute 2 is pivotally connected by an adjustable post 8 to the base frome 7. The length of the post 8 may be adjusted to change the angle of inclination of the chute 2. Attached to the bottom of the chute 2 on each side thereof is a frame member 9 which supports two pairs of bearings 10 mounted on each side of the chute 2 for supporting an upper transverse drive shaft 11 and a lower transverse drive shaft 12. The bottom 3 of the chute 2 has four longitudinal slots therethru indicated by the numeral 13. A plurality of endless sprocket chains 14 are respectively aligned with the longitudinal slots. The above-mentioned sprocket chains are respectively carried on sprockets 15, all of which are mounted and rotate with the shaft 11 and sprockets 16, all of which are carried on the shaft 12 and rotate therewith.

Each of the sprocket chains 14 have a plurality of deflector pins 17 attached thereto in spaced relationship along the length of the chain and attached to the chain in such manner that when they are travelling on the upper run of the chain they will project through the slots 13 and extend above the surface of the bottom 3 of the chute 2. Near the lower end of the chute 2 a plurality of vertical partitions 18 are mounted longitudinally in the chute 2, each partition 18 being in alignment with one of the slots 13. Each of the partitions 18 have a vertical slot 19 in the center thereof to permit the deflectors 17 to pass therethru as they rotate about the sprockets 16 and start their upstream direction of travel indicated by the arrows 20.

At the lower end of the chute a tiltable platform 21 extends transversely across the bottom 3 of the chute adjacent the lower ends of the partitions 18. A gate 22 extends transversely across the chute 2 at the lower or downstream edge of the platform 21. The operation of the platform 21 and the gate 22 will be described more fully later in the specification.

Figure 5:
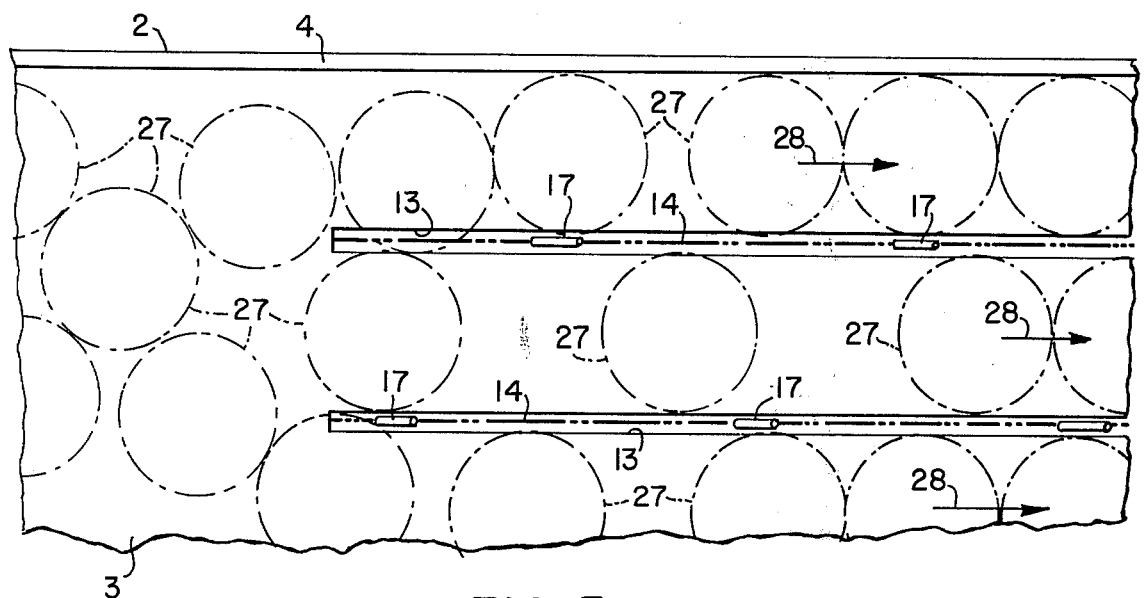
FIG. 5 is a fragmentary plan view of the inclined chute of the invention showing the path of travel of articles being aligned.

The shaft 11 is driven in the direction shown by the arrow 23 by a sprocket 24 which in turn is driven by a motor 25 through a gear box 26. The motor and gear box may be any suitable type that will provide the desired power and speed. In operation a plurality of buns 27 or other similar objects slide down the chute 2 in the direction indicated by arrows 28 in FIG. 5. The deflector pins 17 moving in the opposite or upstream direction from the direction of travel od the buns 27, bump against the buns and urge then into longitudinal rows between the paths of travel of the deflectors 17 on the sprocket chains 14. As shown in both FIGS. 1 and 5, it is desirable that the deflectors 17 be positioned on each sprocket chain 14 in such manner that they will be longitudinally offset from the deflectors 17 on the adjacent sprocket chain 14. This means that the deflectors 17 may be aligned across the chute 2 at an oblique angle. This oblique angle is desired since the buns are less likely to become lodged in the chute than they would if the deflectors 17 were arranged in transverse rows perpendicular to the longitudinal slots 13. As the buns travel toward the lower end of the chute 2 and are aligned in longitudinal rows by the deflectors 17, the rows then slide between the partitions 18 which retain them in rows as they slide onto the platform 21 and come to rest against the gate 22.

Figure 2:
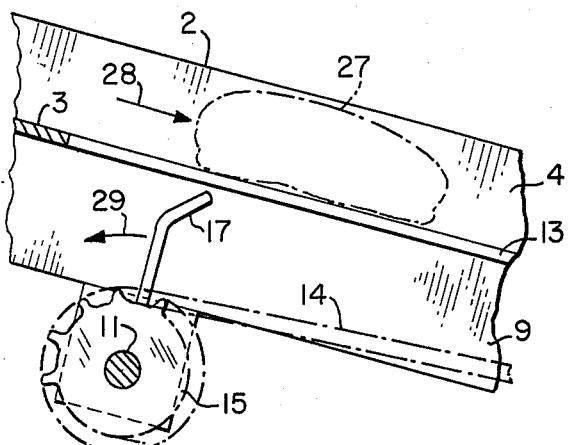
FIG. 2 is a fragmentary cross-sectional view taken on line 2—2 of FIG. 1.
Figure 3:
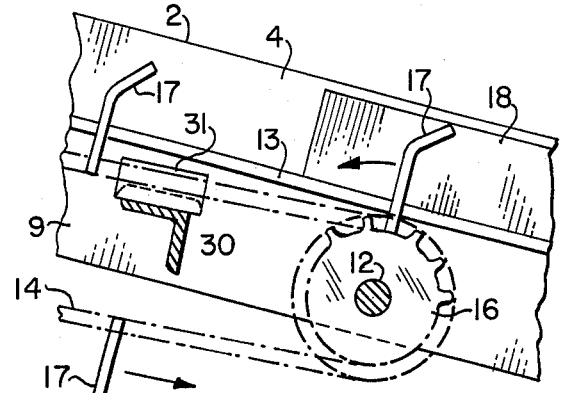
FIG. 3 is a fragmentary cross-sectional view taken on line 3—3 of FIG. 1.
Figure 4:
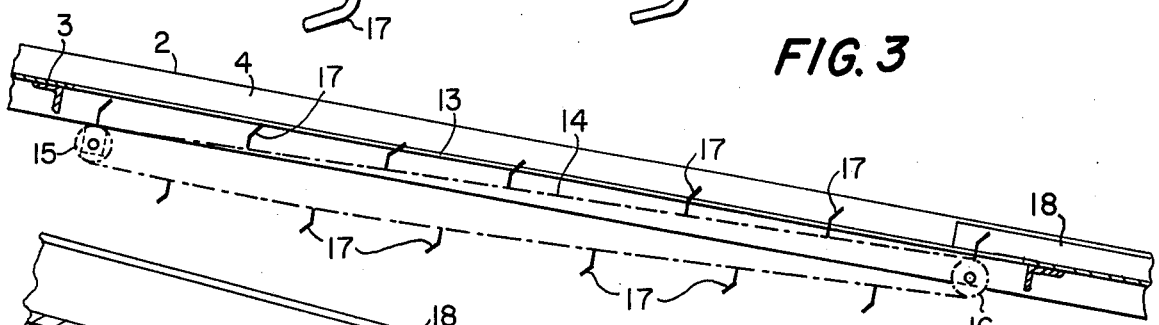
FIG. 4 is a simplified fragmentary cross-sectional view taken longitudinally through the inclined chute and showing the path of travel of the deflectors.

Referring now to FIGS. 2 through 4, it may be seen that the axis of the shaft 11 is spaced a greater distance from the surface of the bottom 3 of the chute 2 than the axis of the shaft 12. This causes the deflector pins to extend the greatest distance above the bottom 3 of the chute at the lower end and gradually decrease in distance until they disappear through the slots 13 before they pass around the sprockets 15 and start along the lower run of the sprocket chain 14.

FIG. 3 illustrates the height of the deflector pins 17 above the chute bottom 3 as they pass around the sprockets 16 and through the center slot of the partitions 18.

FIG. 2 shows the position of one of the deflectors 17 after it has dropped below the surface of the chute bottom 3 so that one of the buns 27 may pass over it without being pinched as the deflector 17 travels around the sprocket 15 in the direction of the arrow 29. If the deflector 17 extended above the surface of the chute bottom 3, it would tend to pinch any buns which it contacted while passing downwardly around the sprocket 15. Thus the lowering of the sprockets 15 eliminates any pinching of the buns which might occur at the upper end of the chute 2.

As shown in FIG. 3, cross braces 30 may extend transversally across between the frame members 9 and carry one or more chain guides 31 to prevent the upper run of the sprocket chains 14 from sagging in the middle and thereby assuring that the deflectors 17 extend the proper distance above the chute bottom 3 to perform their function.

Figure 6:
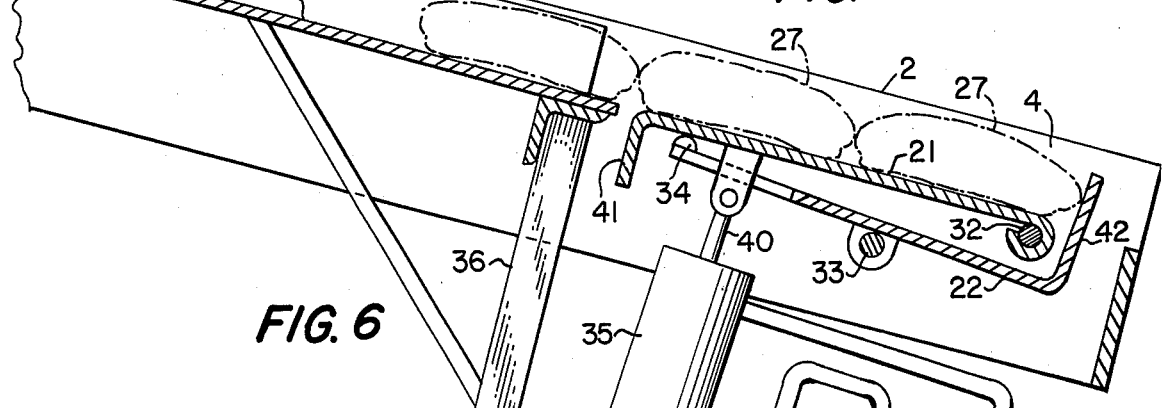
FIG. 6 is a fragmentary cross-sectional view taken on line 6—6 of FIG. 1.
Figure 7:
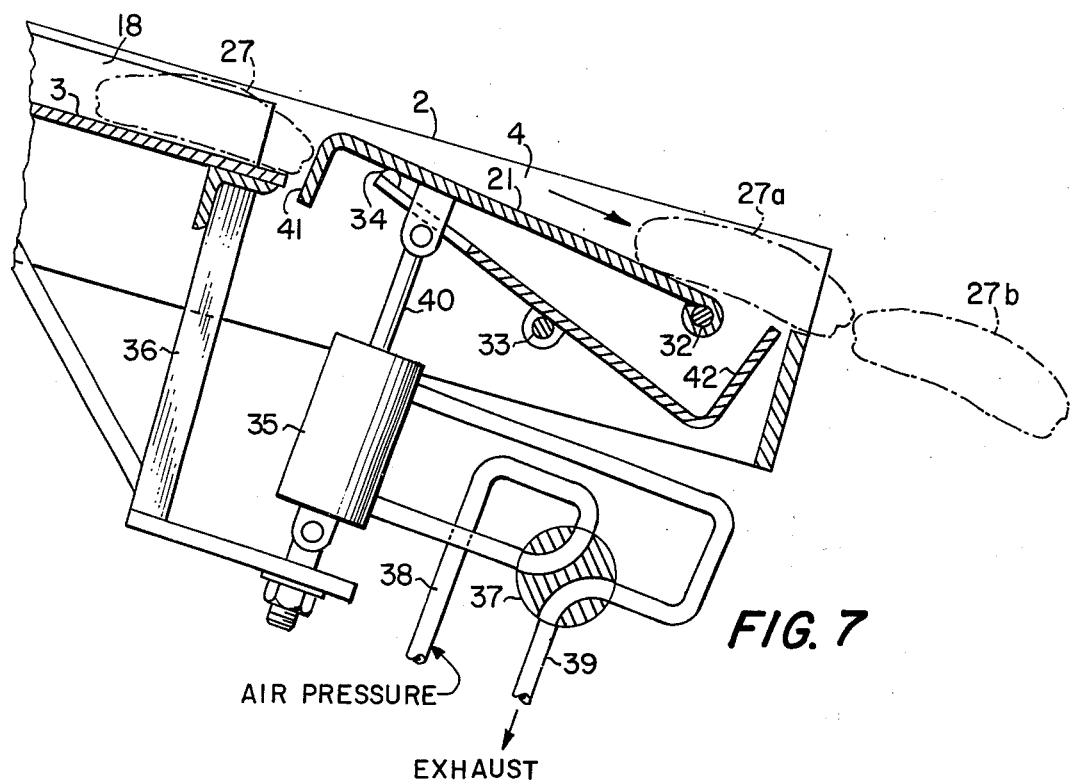
FIG. 7 is a fragmentary cross-sectional view similar to FIG. 6 but showing the article receiving platform in a raised position.

Referring now to FIG. 6, which shows the lower end of the chute 2, a plurality of buns 27 have passed down the chute 2 past the partitions 18 and onto the platform 21 which is pivotally connected to each side 4 of the chute by pivot pin 32. The gate 22 is pivotally connected to each of the sides 4 by a pivot pin 33. The gate 22 has a follower 34 which rests against the lower surface of the platform 21 and follows the movement of the platform when it is moved from the lowered position shown in FIG. 6 to the raised position shown in FIG. 7. The platform 21 is moved by a pneumatic actuator 35 which is mounted on a bracket 36 rigidly attached to the lower surface of the chute bottom 3 or to any other suitable adjacent framework on the chute. The actuator 35 is controlled by a two way valve 37 which alternately connects opposite ends of the actuator to an air pressure line 38 or to exhaust 39. When the valve 37 is positioned as shown in FIG. 6, a plunger 40 of the actuator is withdrawn and the platform is in the lower position in alignment with the chute bottom 3. When the valve 37 is in the position shown in FIG. 7, the plunger 40 is extended and raises the upper edge of the platform 21 in a position where a downwardly turned flange 41 on the platform 21 blocks the passage of the bun 27a so that it cannot slide onto the platform 21. Simultaneously as the platform 21 is raised, the follower 34 on the gate 22 raises with the platform 21 and permits the gate to pivot about the pivot pin 33 thereby causing an upwardly turned flange 42 to drop below the surface of the platform 21 and permit the buns 27b to slide off the platform onto the surface of a packaging machine not shown.

Each time the packaging machine is ready for another group of buns, a signal from the packaging machine actuates the valve 37, which in turn operates the actuator and releases a new group of buns. As shown in the present apparatus, five longitudinal rows of buns are fed onto the platform 21 which is of sufficient width to receive two lateral rows of buns. In other words, the platform 21 contains two lateral rows of buns with five buns in each row. Each time the actuator raises the platform 21 and lowers the gate 22, ten buns slide off the end of the chute 2 onto a receiving surface of a packaging machine with the buns being aligned in the proper position for packaging. A continuous flow of buns may pass from a conveyor to the upper end of the chute 2 and then down the chute where they are aligned in rows and periodically released for packaging.

Figure 8:
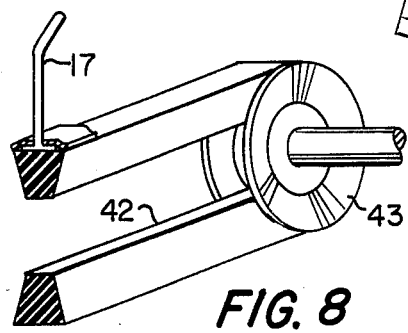
FIG. 8 is a fragmentary perspective view of another embodiment of the invention using a V-belt instead of a sprocket for carrying the deflectors.

FIG. 8 illustrates another embodiment of the invention in which the V-belt 42 passing around a pulley 43 carries a plurality of deflector pins 17 fastened to the top surface of the belt and extending therefrom substantially perpendicualr to the belt.

It may be seen that in addition to the sprockets 14 or the belt 42 as illustrated, other types of conveyor means may be used to drive the deflectors in the opposite direction from the flow of the buns. Instead of being positioned beneath the chute 2, the deflector conveyor may be positioned above the chute with the deflector extending downwardly into the path of the moving buns. Other means may be employed to move the deflectors 17 in the opposite direction from the movement of the buns. It should also be understood that any type of actuator may be used to actuate the bun receiving platform 21 and the gate 22. Various other modifications may be made without departing from the scope of the invention.

The embodiments of the invention in which an exclusive property or privilege is claimed are defined as follows:

1. An article aligning apparatus comprising:
   A. an inclined chute for receiving articles to be aligned in rows;
   B. a plurality of longitudinal slots in the bottom of the chute;
   C. a plurality of spaced-apart upstanding members extending upwardly through the slots and moveable therein;
   D. conveyor means having the upstanding members connected thereto, continuously moving the upstanding members longitudinally of the slots from the downstream to the upstream end thereof;
   E. said upstanding members contacting any articles sliding down the chute and directing the articles into rows between the paths of travel of said members;
   F. means at the lower end of the chute for periodically releasing a predetermined number of articles from each row while retaining any remaining articles in the chute; and
   G. longitudinal partition means at the lower end of the chute aligned with the longitudinal slots including a number of partitions each having a longitudinal center slot through which the upstanding members pass.

2. An article aligning apparatus for receiving a flow of separate unaligned articles and arranging the articles into rows extending in the direction of article flow as the articles move across the apparatus, said apparatus comprising;
   A. an article support surface having an upstream end and a downstream end, said surface arranged to receive the flow of unaligned articles at the upstream end so that the articles move in a longitudinal direction across the surface toward the downstream end;
   B. a plurality of article deflecting members positioned above the support surface at a height for engagement with articles in the flow of unaligned articles moving across the surface, said plurality of members being spaced apart along a longitudinal line extending between the downstream end of the surface and the upstream end of the surface; and
   C. drive means for moving the plurality of deflecting members along said longitudinal line from the downstream end of the surface toward the upstream end of the surface whereby individual article deflecting members moving in one longitudinal direction bump against individual unaligned articles in said flow moving in the opposite longitudinal direction across the surface and deflect such articles laterally of said line so that the articles are aligned in rows on either side of said line.

3. An article aligning apparatus for receiving a flow of separate unaligned articles and arranging the articles into rows extending in the direction of article flow as the articles move across the apparatus, said apparatus comprising:
- A. a support surface having an upstream end and a downstream end, said surface arranged to receive the flow of unaligned articles at the upstream end so that the articles move in one longitudinal direction across the surface toward the downstream end;
- B. a plurality of parallel rows of article deflecting members with the members in each row positioned above the support surface at a height for engagement with articles in the flow of unaligned articles and spaced along a longitudinal line extending between the downstream end of the surface and the upstream end of the surface, said rows being spaced apart laterally on the surface a distance sufficient to allow articles to pass between adjacent rows; and
- C. means for moving the deflecting members in each row along its respective line in a longitudinal direction opposite to the direction of flow of the articles moving across the support surface whereby individual article deflecting members bump against individual unaligned articles in the flow and deflect such articles laterally so that the articles are aligned on the support surface in spaces on either side of the rows of article deflecting members.

4. An article aligning apparatus as in claim 3 wherein the closest adjacent article deflecting members in adjacent rows are longitudinally offset.

5. An article aligning apparatus for receiving a flow of separate unaligned articles and arranging the articles into rows extending in the direction of article flow as the articles move across the apparatus, said apparatus comprising:
- A. an article transporting surface moving the unaligned articles in one longitudinal direction from an upstream end of the aligning apparatus to a downstream end thereof while permitting independent lateral movement of each of the articles thereon;
- B. a plurality of parallel longitudinal continuous conveyors spaced laterally across the transporting surface, each continuous conveyor including a run adjacent the transporting surface extending in a direction from the downstream end of the surface toward the upstream end thereof, a plurality of spaced apart aligning members extending outwardly from each of said conveyors so that the aligning members on said runs are positioned adjacent to said transporting surface for engagement with the unaligned articles in the flow of articles, said runs being spaced apart a distance sufficient to permit the passage of articles between the aligning members thereon; and
- C. drive means for said conveyors to move the members on said runs in the opposite longitudinal direction from the longitudinal downstream direction of movement of the articles, whereby individual article deflecting members, while moving in said opposite direction, bump against individual unaligned articles moving downstream and deflect such articles laterally to either side of the deflecting units.

* * * * *